(No Model.) 3 Sheets—Sheet 3.
J. W. T. OLÁN.
MANUFACTURE OF INCANDESCENT LAMPS.
No. 586,055. Patented July 6, 1897.
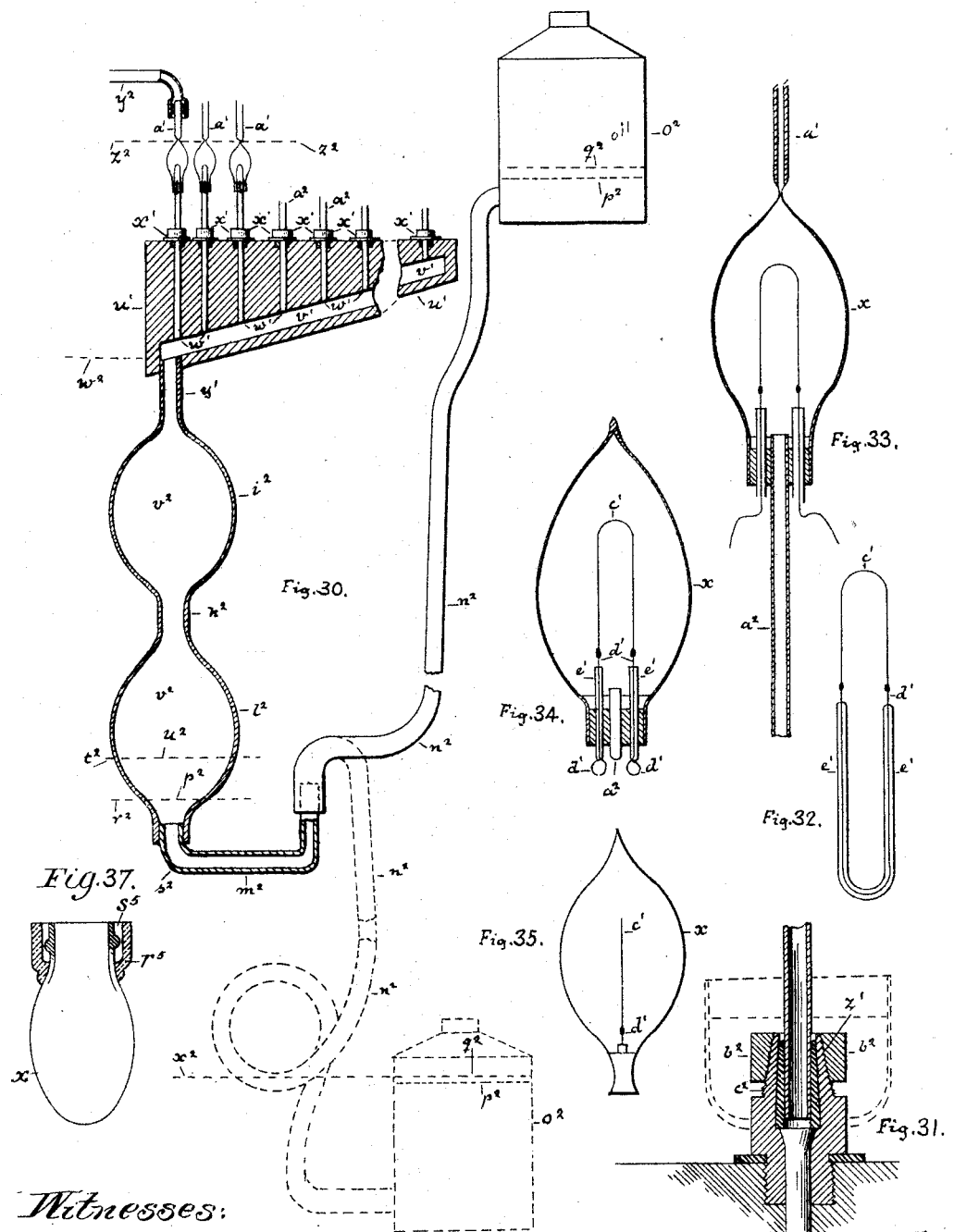
Witnesses:
J. B. McGirr.
H. D. Orr.
Inventor
John W. Th. Olán

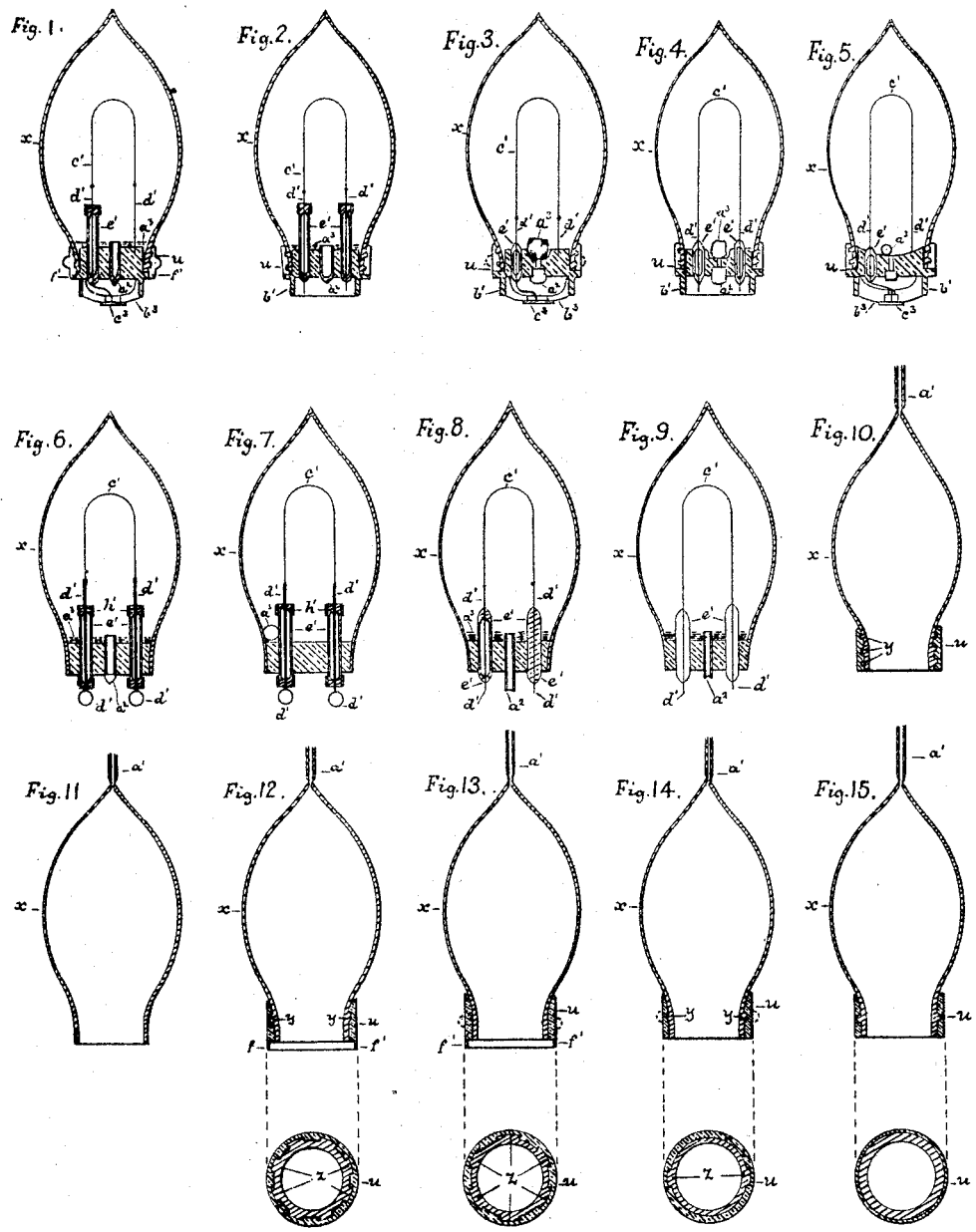

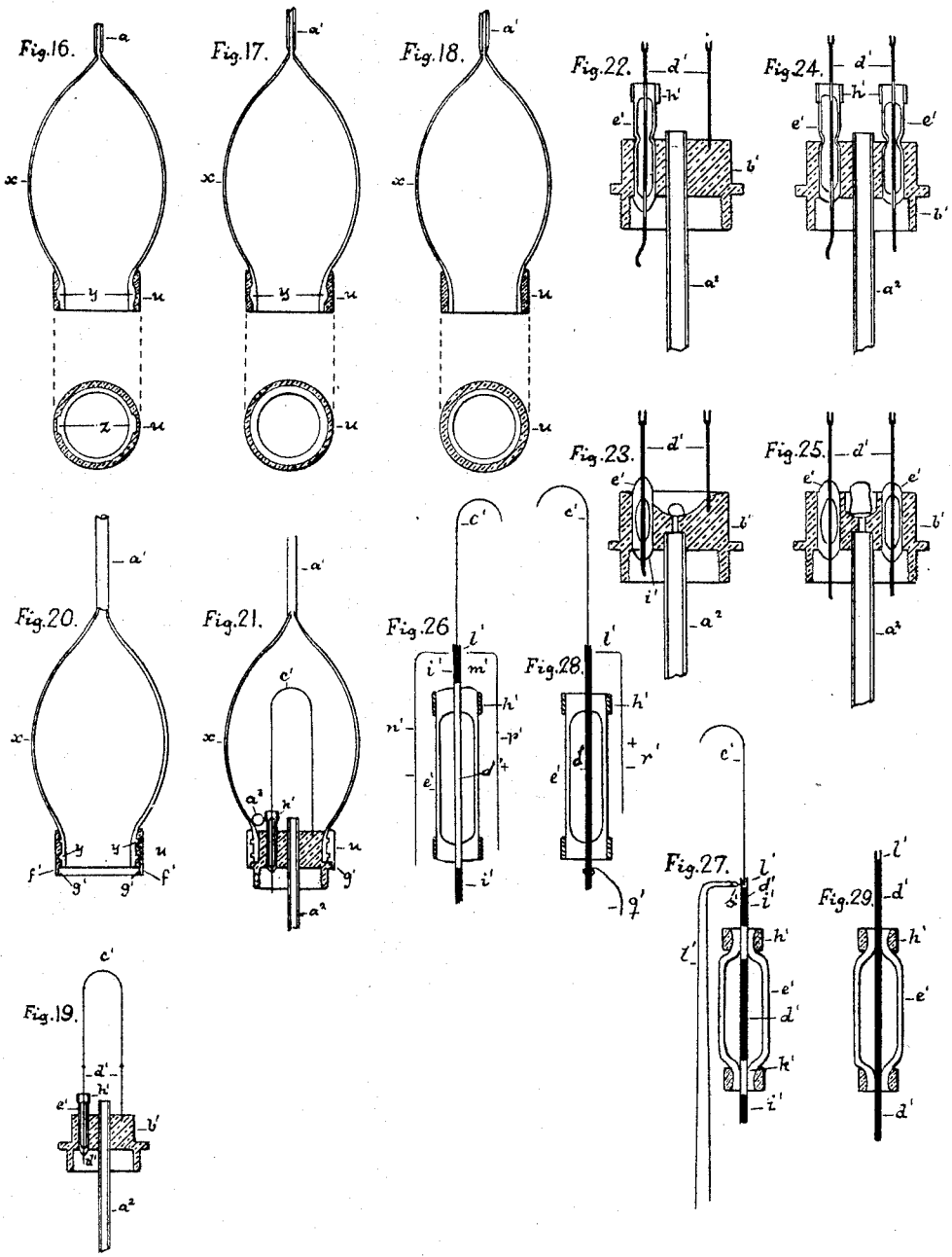

UNITED STATES PATENT OFFICE.

JOHAN W. TH. OLÁN, OF NEW YORK, N. Y.

MANUFACTURE OF INCANDESCENT LAMPS.

SPECIFICATION forming part of Letters Patent No. 586,055, dated July 6, 1897.

Application filed March 13, 1893. Serial No. 465,761. (No model.)

*To all whom it may concern:*

Be it known that I, JOHAN W. TH. OLÁN, a subject of the King of Sweden and Norway, and a resident of New York, in the county of New York and State of New York, have invented certain new and useful Improvements in the Manufacture of Incandescent Lamps, of which the following is a specification.

My invention relates to the manufacture of incandescent electric lamps.

The object of my invention is to improve imperfections and to correct various and essential errors in the present manufacture of the lamps in question, so as to provide a procedure for the aforesaid purpose which will give as a product an incandescent lamp that will reach nearer by far than any other lamp heretofore invented the practical limit of perfection.

The main principle for an incandescent lamp on which experiments have been made for more than three decennials and whereof the chief features consist of a carbon heated by electricity to incandescence within a hermetically-closed glass globe from an electric source outside of the globe, under conditions designed to prevent chemical reaction on the carbon, seems to have been accepted by all inventors who have been endeavoring to improve said lamps as the only principle on which the hope of success could be based; but no one, so far as yet known, has provided any other than relatively defective means for the intended result. It is generally understood that could the incandescent carbon be made to glow in a practically perfect vacuum-globe or in a really inert gas the chief part of the problem in question would be solved, but the inventor who has claimed the vacuum-bulb has so far failed to provide means for producing any other than a very defective vacuum therein—that is to say, none at all—and where an inert gas has been claimed such gas has only erroneously been supposed to possess said quality. The mercury-pump heretofore used by inventors for exhausting the incandescent bulbs leaves behind a quantity of gas large enough to cause a quick destruction of the incandescent carbon when heated to a brilliant white heat, and even in lamps supposed to be completely exhausted by said pump I have found the remaining gas to correspond to more than two cubic centimeters gas at the pressure of one atmosphere. This would in itself in most cases not be sufficient to cause the destruction of the carbon filament used, but upon considering the chemical reactions between the carbon filament and the remaining gases within the bulb it will be apparent not only that a small quantity of gas can cause a slower or quicker and successive destruction of said filament and why it really does so, but also that the claimed efficiency of the so-called "inert gases" heretofore proposed is without foundation, and the great advantage of my present invention will thereby at the same time be the more readily understood. Oxygen (O) within the bulb combines with the carbon, (C,) forming $CO-CO_2$, whereof $CO_2$ again attacks the white-hot carbon $(CO_2-C-2CO)CO$ as a final result, thus tending to fill up the globe. There it is again decomposed into $CO_2-C$ $(2CO-CO_2-C)$, the carbon (C) being deposited on the walls of the globe and on one end of the carbon filament. This latter deposit is due to the potential difference of the current at the two ends of the carbon filament, said filament thereby acting in manner similar to a conducting fluid, into which two metal poles dip and in which a chemical combination (here CO. which in a glowing state fills the pores of the filament) is decomposed by the current into its constituents, (C at the one pole and O at the other.) It is evident from this that oxygen will be set free at the positive pole, leaving an equivalent of carbon deposited in the filament and combining itself with the surrounding CO to form $CO_2 (O+CO=CO_2)$. The $CO_2$ thus formed has no power to attack that end of the filament where O is set free, but under the continuous movement of the gases within the globe (which results as a physical effect of the colder globe and the hot filament) said $CO_2$ will successively meet the carbon set free at the negative pole and combine therewith to form $CO(C+CO_2=2CO)$. An equivalent O will thereby be left free for action at said pole and will combine with an equivalent of carbon from the filament. As a total result it will follow that the negative end of the carbon filament will continuously decrease and the positive end thereof increase until by this successive and continuous reaction the filament will be destroyed even though the quantity of oxygen gas left in the globe was very small. It is, however, to be remembered that although the potential difference of the current within the carbon filament causes a successive and renewed chemical reaction within the globe with reference to CO and $CO_2$, so as to cause a final destruction of the filament, said reaction would for other reasons take place in spite of said potential difference and, in fact, takes place within the globe in addition thereto. It is a fact well known to every chemist that CO at a certain lower temperature—for instance, when passing through a red-hot tube—is decomposed into $CO_2-C(2CO-CO_2=C)$, and that $CO_2$ at a higher temperature in the presence of carbon combines therewith, giving as a result $CO(CO_2+C)=2CO$. Now the conditions for both of these reactions are at hand within the incandescent globe where a quantity of air has been left. The CO formed in the globe from the oxygen and carbon is at a distance from the carbon filament, where the temperature corresponds to that at which the before-mentioned dissociation takes place, continuously transformed into $CO_2+C(2CO-CO_2=C)$, whereupon the carbon (C) is deposited everywhere within the globe—for instance, on the glass wall—while the $CO_2$ again attacks the white-hot carbon filament, combining with a fresh equivalent thereof to form $CO(CO_2+C=2CO)$. The gradual destruction of the carbon filament in an incandescent globe where a little quantity of air—that is to say, oxygen—has been left behind is therefore demonstrated beyond doubt, even when no account is taken of the reaction in the same direction caused by the potential difference of the current within the carbon filament. It consequently follows in the manufacture of incandescent lamps that in order to secure their durability, first, every trace of oxygen or its gaseous combinations must, if possible, be removed from the globe. Now the same successive destruction of the carbon filament caused by and just described with reference to oxygen remaining in the globe is equally and in a similar or corresponding way caused by all other gases heretofore regarded by inventors as inert. That nitrogen, whose chemical affinity to other elements is highly increased by heat, can at white heat directly combine with carbon has already been proved to be a scientific fact, and my own investigations on that subject tend to prove that the direct chemical reaction with carbon of said gas is quite energetic at white heat. In carbon filaments made from vegetable fibers and containing alkalies and silicon the combination of the nitrogen with the carbon is highly facilitated by the predisposing and intermediating action of said substances with reference to the reaction in question; also, the presence of watery vapor ($H_2O$) acts in the same direction. The carbon-nitrogen and carbon-nitrogen-hydrogen combinations CN and CNH (by renewed decomposition and recombination) resulting from said reaction thereafter cause the same successive destruction of the carbon filament as described with reference to the combination of oxygen with carbon, (CO and $CO_2$.) We arrive, therefore, at the second conclusion with reference to an incandescent lamp in which a carbon filament is used: The last traces of nitrogen and its gaseous combinations and watery vapor ($H_2O$) must also, if possible, be removed from the incandescent globe, and in addition to this the carbon filament must be pure in the highest degree, especially free from alkali or silicon combinations. Moreover, hydrogen and carbon can under the influence of the electric current directly combine with each other, and I have found that this takes place to a much larger extent than science heretofore seems to have ascertained. As soon as a hydrocarbon has been formed in this way within the globe it will by dissociation and recombination cause the same successive destruction of the carbon filament as demonstrated with respect to the oxygen and nitrogen combinations. In the same way as oxygen, nitrogen, and hydrogen gas thus prove destructive to the carbon filament within the globe so likewise all their gaseous combinations are not inert with respect to the carbon filament, and the inventors who claim ammonium gas or hydrocarbon gases as inert are as far from being correct as those who would claim such quality for CO or $CO_2$ or HCl or BrH. The only gases which seem theoretically suitable are perfectly dry chlorin or bromin gas, but so far as I am aware they have not heretofore been used. It results from this that for a definite and practical solution of the problem of producing a reliable and durable incandescent lamp the carbon filament heretofore used by inventors must either be replaced by a substance which will not form gaseous combinations with the gases remaining within the globe, or where the carbon filament is used said filament must be made perfectly pure, free from metal salts and silicon combinations, and the inclosing vacuum globe must be made practically perfect—that is to say, free from objectionable remains of destructive gases.

My invention consists in my various and combined means of satisfying these conditions, the various processes and operations employed in manufacturing my lamp, the novel apparatus and parts thereof used for said manufacture, and the various forms and novel features and parts of the lamp resulting from said manufacture, as hereinafter further specified and claimed. In carrying out my invention I inclose within a globe made of glass or chiefly of glass or of other substance a strip or filament of pure or purified carbon or of titanium, zirconium, thorium, chromium, tungsten, molybdenum, tantalium, or niobium, or of infusible conducting combinations of the latter, eight (8) substances mutually or respectively, thereby providing means for outside electrical connection through the globe with the ends of said strip or filament. The globe is thereafter exhausted, so as to remove from the globe objectionable residues of air or gases previously contained in the globe or introduced therein during the exhausting operation itself. Especially when the carbon filament is used a small quantity of alkali metal or metals is (either previously to or during the exhausting operation) introduced in or left within the globe, so as to remain therein after its sealing, and said sealing of the globe is afterward effected, so as to hermetically close the globe.

Referring to the accompanying drawings, Figures 1 to 9 represent sectional views of various forms of my lamp. Figs. 10 and 11 are sectional views of globes for my lamp. Figs. 12 to 18 are detail views of Fig. 10, showing various forms of the part $u$ thereof. Figs. 19 to 21 illustrate the assembling together of the parts of a lamp. Figs. 22, 23, 24, and 25 are detail views of part $b'$, &c., of Figs. 1, 5, 2, and 4, respectively, showing different ways of arranging insulating and sealing the "leading-in" conductors of my lamp. Figs. 26, 27, 28, and 29 are illustrations of various modifications of parts $d'$ and $e'$, Figs. 26, 27, and 28 also showing various means for connecting the incandescent filament to its pole-conductors. Fig. 30 represents an apparatus for removing the air from the globes and supplying alkali metal thereto. Fig. 31 is a detailed view of part $X'$ of Fig. 30. Figs. 32, 33, and 34 represent successive steps in the manufacture of a lamp which is to be afterward exhausted and finished. Fig. 35 is a partial side view of Fig. 34, showing the form of the sealed neck of the globe. Fig. 36 is a section view through said neck. Fig. 37 is a section showing one method for casting the ring upon the lamp-neck.

The principal forms of my lamp are the following:

First. One form wherein the neck of the inclosing globe is melted or fused to a metal ring surrounding the same, said ring thereby being hermetically sealed to the globe, whereupon a metal stopper carrying the incandescent body and the insulated pole connections thereof is by soldering or electroplating hermetically secured to said ring, Figs. 1 to 5.

Second. Another form wherein the neck of the inclosing glass globe is fused to two glass tubes, in the ends of which the metallic pole-conductors entering the globe are hermetically sealed by fusion of the glass, the seals at the same time being protected from fracture by surrounding metal rings secured to the seals at both ends of each tube intimately and by fusion, Figs. 6 and 7.

Third. A third form wherein the neck of the inclosing glass globe is fused to glass tubes into which the conductors entering the globe are hermetically sealed, but where the seals are without outside metallic protection, the metallic conductors consisting instead of a metallic composition which has the same or approximately the same expansion for heat as glass, Figs. 8 and 9.

Referring to the first of said forms, Figs. 1 to 5 and 12 to 18, $u$ is a ring of metal. To this ring I either secure an interior glass coating, preferably by dipping the ring down into a melted glass bath, whereupon the neck of the globe is fused to said glass coating inside the ring, or I secure the ring to a glass-blower pipe in such a way that the ring will serve as the opening thereof, whereupon the globe is directly blown out from the ring, which is thereby at the same time secured and hermetically sealed thereto. To accomplish this result, the ring $u$ is fastened into a glass-blower's pipe adapted for the purpose, whereupon the ring is dipped into a glass bath, and the globe is thereafter blown out from the ring. The ring $u$ I preferably make of tensile elastic metal and so thin that during contraction in cooling it will stretch rather than crush its inside glass coating—that is to say, the neck of the glass globe extending therein. However, when I use metal compositions of approximately the same expansion for heat as glass (said compositions being produced by alloying metals of greater expansion from heat than glass with metals or elements of which said expansion is less than that of glass) I can without inconvenience use rings of any desired thickness. As metals used for the thinner stretching-rings I quote, for example, soft iron, steel, aluminium, nickel, silver, aluminium copper, aluminium silver, copper zinc, (brass,) and others, and as compositions of about the same expansion as glass I cite iron, aluminium, and any of the semiprecious metals of higher melting temperature than glass in proper combination with silicon or other elements having less expansion from heat than glass—for instance, osmium and arsenic.

Figs. 12 to 18 show various forms of the metal ring $u$ sealed to the respective globes $x$, the horizontal grooves $y$ and the vertical ones $z$ being made in some of them in order to make more solid and indestructible the seal between said ring and the glass.

In instances where for the evacuation of the lamp the exhaustion is directly applied the inclosing globe $x$ can be without the glass tube $a'$, but in most cases the glass tube $a'$ must be attached thereto, so as to communicate with the interior thereof, Fig. 10. When the metal stopper $b'$, Fig. 19, carrying always the carbon filament $c'$, with the pole-conductor $d'$ and their insulators $e'$, and in most cases the tube $a^2$, has been introduced in place into the neck of the inclosing globe $x$, Fig. 20, and hermetically secured thereto by soldering or electroplating, the lamp, as shown in Fig. 21, is ready for exhaustion. A tube $a^2$ is usually adapted to the plug $b'$ in order to serve during said process of exhaustion. It is either made of glass and is then hermetically sealed by fusion within the plug $b'$, so as to form a tubular conduit therethrough, Figs. 22 and 24, or it may be made of metal and is then screwed in place within $b'$ and soldered, so as to hermetically unite therewith and so as to form a tubular continuation of the hole or opening in $b'$, Figs. 23 and 25. In order to facilitate the soldering or electroplating, the extension $f'$ of said ring $u$, Fig. 20, may, in order to secure $b'$ to $u$, carry a screw-thread $g'$, into which a corresponding screw-thread groove on the plug $b'$, Fig. 21, engages, whereby said plug may be screwed tight to the globe before said soldering or electroplating.

In Figs. 1 to 9 and 22 to 25 are shown the different ways in which the leading-in conductors $d'$, intended to carry the incandescent filament, are insulated and how said conductors are arranged in order to secure connection from the exterior to the interior of the globe and with said filament.

In Figs. 1, 3, 5, 22, and 23 the metal plug $b'$ itself serves as one connection from the exterior to the interior of the globe, one of the conductors $d'$ being directly connected thereto, while the other wire or conductor enters the globe through a fused hermetical glass seal $e'$, the latter being either short and usually inclosed within the plug $b'$, as in Figs. 3, 5, and 23, or extending within the globe as a tube, Figs. 1 and 22, one end of which by fusion forms a hermetical seal with the entering conductor $d'$ and with the metal of the plug $b'$, thereby at the same time insulating $b'$ and $d'$ from each other, while the other end of said tube is by fusion hermetically sealed to said conductor $d'$ within a surrounding protecting metal ring $h'$.

Figs. 4 and 25 illustrate one form of my lamp in which both the leading-in conductors $d'$ enter through and are insulated from $b'$ by fused short glass seals $e'$. Figs. 9 and 24 show another form wherein both of said conductors $d'$ are hermetically sealed by fusion within glass tubes, said tubes of course being also hermetically sealed by fusion in the former case to the neck of the globe, in the latter to $b'$. The entering conductors can of course be of any desirable size, as the solid way, in which the seals are protected, either by $b'$ or by $h'$, or both, will prevent any fracture of the seals. The arrangement with the protecting-ring $h'$ is therefore a very important feature and a great improvement upon lamps heretofore invented. It is here to be observed that when I use entering conductors of the same expansion for heat as that of glass the described protecting-ring $h'$ around the seals in the upper end of the glass tubes $e'$ can be dispensed with.

In Figs. 26 to 29 is illustrated one modification of the sealing glass tube $e'$, on which protecting metal rings $h'$ are used around the seals at both ends of the tube. Said tubes are to be used in the second form, Figs. 6 and 7, where both the sealing-tubes $e'$ as well as the tube $a^2$ are all sealed by fusion and directly in the glass of the neck of the globe; but as the upper ring $h'$ is also used in the form herein first referred to reference may here be made to the various natures of the seals protected by said ring $h'$, as illustrated by corresponding figures.

In Fig. 26 the glass tube $e'$ is sealed around a tubular metal conductor $d'$. Said tube is made of elastic metal—for instance, spring-steel or others—in order to allow an elastical compression of said tubular conductor rather than the fracturing of the glass tube and its protecting metal ring $h'$. Both ends of said tubular conductor are, of course, properly and hermetically sealed by proper not easily fusible soldering composition $i'$—for instance, zinc-silver or zinc-brass.

Fig. 27 illustrates one modification wherein the glass tube $e'$ is sealed at both ends around a conductor $d'$, in both ends of which latter are drilled tubular cavities $k'$ for the same purpose of making the seal under $h'$ elastic, as just described with reference to Fig. 26. Said cavities $k'$ may also be sealed beyond the seals within $h'$ with the metal composition $i'$, in order to lessen the resistance of the conductor $d'$ in question, whereby also the heat developed at the seals under $h'$ will be less.

Fig. 28 illustrates another modification, where $e'$ is sealed at both ends around a solid metal conductor $d'$ and where for that reason the protecting-ring $h'$ around the seal is made from metal of great tensile strength—for instance, steel, iron, &c. In order, however, to make the tensile strength of said ring $h'$ still more considerable and the seal thereunder still more reliable, I also use the modified form of the glass tube $e'$, as represented in Figs. 27 and 29. Said tube $e'$ is there contracted toward the ends, so as to make the glass body of the seals around the conductors $d'$ relatively very small. At the same time I can increase the thickness of the ring $h'$ without inconvenience, thereby increasing considerably its relative and absolute strength.

The connection of the upper ends of the conductors to the carbon filament is secured, as shown in Figs. 26 to 28. The ends of the carbon filament having previously been electroplated with metal and thereafter carefully washed in distilled water, so as to fully remove remaining metal salts from the electrolyte used, and dried at 225° Fahrenheit are thereafter introduced into the forked ends $l'$ of said conductors $d'$, whereupon said ends $l'$ are cautiously pressed together with a pair of pliers or other suitable instrument.

I preferably use carbon filaments electroplated on their ends with aluminium where the conductors $d'$ are made from aluminium, electroplating with iron when steel or iron conductors are used. In other cases the ends of the filament, as well as those of the conductors $d'$, are preferably plated with silver. The separate electroplating of the ends of the carbon filament is of great importance, as the metal only by separate plating will deposit densely and solidly on the carbon, so as to constitute thereon afterward a good and solid coating. The electroplating with silver or other metal not oxidizable in air or water is of special importance, first, in order to allow a careful washing (chemically speaking) of the filament after the electroplating process without oxidizing the deposited layer and, further, for the equally-important reason that a filament so prepared can be stored without disadvantage for any length of time and sold as a special article in order to be used as reserve filament for that form of my lamp in which, as hereinafter demonstrated, a destroyed filament may be easily replaced. I make said deposited silver layer on the ends of the filament of sufficient length to allow without inconvenience the direct soldering or alloying of one part of said layer to the metal conductor $d'$. As solder or alloying intermedium I use for the purpose, zinc, zinc silver, zinc brass, or other suitable material. By reason of the property of aluminium and iron to weld and that of zinc, zinc silver, &c., to easily alloy with silver a solid and durable connection will by the means just described be secured between the carbon filament and the conductors $d'$ when the contacting surfaces are properly heated. Said heating of the joints in $l'$ I effectuate in different ways, preferably, though, as represented in Figs. 26 to 28.

In Fig. 26 $m'$ is a small electric spark striking through $l'$ between the two end poles of a high-tension circuit, $n'$ representing a negative and $p'$ a positive pole wire of said circuit. By the heating effect of said spark a solid metallic connection between $e'$ and $d'$ will be secured. A small discharge of static electricity may of course also be used in the same way for the same purpose. Even a small voltaic arc I use with advantage. This is illustrated in Fig. 28, where $q'$ is the negative and $r'$ the positive pole of a circuit wherein passes an electric current sufficiently strong to form a small arc at $l'$ if $q'$ is first brought in contact with $d'$ and $r'$ with $l'$ and $r'$ thereafter slightly removed from $l'$, as shown on the figure, so as to form the intended arc.

In Fig. 27 is represented a third method which I use for the proper heating of $l'$ after having attached $c'$ to $d'$. In said figure $s'$ is a miniature flame of burning hydrogen gas from the pipe $t'$, which, as shown, applied to the joint at $l'$ will cause the intended solid connection between the plating on $c'$ and the conductor $d'$.

Up to the process of exhaustion the procedure with reference to the second main form of my lamp, as shown, for instance, in Fig. 6, are of course all the same as or corresponding to those carried on with reference to the main form hereinbefore described, except that the tubes $e'$ and the tube $a'$ (the latter in this form always of glass) are directly and hermetically secured by fusion to the neck of the glass globe and that, further, the tubes $e'$ have protecting-rings $h'$ around the seals at both ends. The same can be said with reference to the third main form, as shown in Fig. 8, with the exception that the protecting-rings $h'$ in this latter form can be entirely dispensed with. The tubes $e'$, with the sealed-in conductors $d'$, as well as the tube $a'$, are of course temporarily inserted into a suitable holder and the carbon filament is secured to the conductors $d'$ before the sealing in of said tubes into the globe.

Figs. 32 and 33 illustrate another proceeding with the object of facilitating the sealing in of the tubes $e'$, &c., into the globe. To the ends of the conductor $d'$, sealed in the double bent tube $e'$, the filament $c'$ is attached, Fig. 32, whereupon both the ends of $e'$ and the tube $a^2$ are suitably sealed into the globe, the bend of $e'$, extending outside the globe, crushed so as to uncover $d'$, and $d'$ finally cut, as shown in Fig. 33. When in fused condition, the neck of the glass globe is pressed together with a pair of pliers of such construction that the resulting compressed seal will have a form similar to that illustrated by Figs. 35 and 36, the former showing the edge of and the latter a section through the seal.

The form shown in Fig. 35 will facilitate the attachment of the finishing-fixture to the lamp, and the form shown in Fig. 36 is necessary in order not to press together the tube $a^2$ during the sealing operation.

When ready for exhaustion, all three forms of my lamp are connected with an exhausting apparatus. When the apparatus represented by Fig. 30 is used, the lamps are, as shown in said figure, hermetically secured to the part $u'$ thereof, so as to communicate with the interior cavity $v'$ of said part. Said cavity is completely surrounded by strong metal walls and is in communication with the exterior only by the conduits $w'$ (to which the lamps are secured by the joint $x'$) and by the tube $y'$, hermetically secured to $u'$. The hermetical connection of the lamp-globes with the apparatus may conveniently be made as shown in Fig. 31, where $z'$ is a rubber packing tightly pressed to the tube $a'$ or $a^2$ and to the surrounding metal of $x'$ by the slightly-conical nut $b^2$, whereof the part $c^2$, being elastic, will allow the necessary compression of the rubber for making the joint hermetical. If necessary, a vessel filled with oil or other suitable liquid may surround the joint, as indicated by the dotted lines in the figure in question.

The tube $y'$ of the apparatus, Fig. 30, is in hermetical communication with the vessel $i^2$, which vessel must be of about one third larger volume than all the lamps jointly which are to be evacuated by the apparatus. Said vessel communicates also hermetically, by means of the conduit $k^2$, with the vessel $l^2$, and this latter vessel, through the upwardly-curved end tube $m^2$ and the rubber tube $n^2$, is in hermetical connection with the vessel $o^2$. The vessels $i^2$, $l^2$, and $o^2$ are of about the same size, and means are provided for raising and lowering the vessel $o^2$ at will, as indicated by the dotted lines of part of the figure.

When the apparatus is to be used, the mercury $p^2$, having on top a layer of oil or water $q^2$, fills the vessel $o^2$, and said mercury quantity continues through the rubber tube $n^2$ and the tube $m^2$ up to the line $r^2$ on the other side of the bend $s^2$, this when $o^2$ is in its lowest position. The vessel $l^2$ has from line $r^2$ to line $t^2$ a layer of a heavy hydrocarbon $u^2$—for instance, anilin oil—and the remaining space of vessels $l^2$ and $i^2$ and the tube $y'$ up to the part $u'$ is filled with that well-known composition $v^2$ of sodium and potassium, which at ordinary temperature remains fluid-like mercury. Said composition, being lighter than the oil, will always float on the top thereof, whereby amalgamation of the alkaline metals by the mercury is prevented. The combined pressure of the alkaline-metal composition $v^2$, the oil $u^2$, and the mercury $p^2$ must for the height between lines $x^2$ and $w^2$ correspond to the highest atmospheric pressure or to the pressure of a mercury column of about eight hundred millimeters. The mercury is used in the apparatus in order to reduce the distance between lines $w^2$ and $x^2$, but by correspondingly lengthening the tubes combining the respective vessels other suitable liquids—for instance, oil or the fluid alkali-metal composition alone—can with advantage be used.

The process of exhaustion with the apparatus is the following: When the lamps to be exhausted are hermetically connected with the apparatus, as shown and described, and such openings at $x'$ suitably sealed, into which lamps for one reason or another may not have been introduced at the same time the vessel $o^2$ has been raised so as to make the alkali-metal composition enter the cavity $v'$ up to the line $w^2$, dry hydrogen gas is introduced through one or more of the upper tubes of the lamp-globes—for instance, the tube $a'$, which is connected to the rubber tube $y^2$. (Shown in the figure.) It will then enter, through said tube $a'$ and its corresponding globe $x$, the cavity $v'$ and the other lamp-globes in communication therewith and successively drive out through the tubes $a'$ of the other globes all the air from the cavity and the said globes, which after awhile will contain pure hydrogen gas. An electric current can thereafter be made to pass through the carbon filaments of the lamps strong enough to make them glow with reddish-yellow light, while the hydrogen gas is still uninterrupted by passing through the globes. The oxygen included in the pores of the carbon filaments will then combine with the corresponding equivalent carbon or hydrogen and be carried off by the hydrogen gas. The current is thereafter turned off and the vessel $o^2$ raised, so as to make the alkaline-metal composition enter the globes and rise to the line $z^2$ of the upper tubes thereof, thereby driving out from the globe the hydrogen gas. The tubes $a'$ are now, by means of a small blowpipe-flame, fused together along the line $z^2$, whereupon the vessel $o^2$ is again lowered, so as to make the alkali-metal composition run out again from the globes, thereby leaving behind a practically-complete vacuum in said globes and so as to sink down to the line $w^2$ or so far into the tube $y'$ as to make the combined pressure of the different liquids in question correspond to the atmospheric pressure. All the tubes $a^2$ are thereupon also hermetically sealed as near as possible to the globes, the glass tubes by being cautiously fused together by means of a blowpipe-flame, and the metal tubes when used by being vigorously pressed flat to a portion of about three-fourths of an inch by means of a suitable instrument—for instance, a pair of pliers with long arms or levers. Said metal tubes being made from thin flexible metal—for instance, brass, copper, nickel, &c.—with an inside coating of soft metal, preferably lead or lead-tin, &c., will thereby become hermetically sealed. The lamps are now detached from the exhausting apparatus, and the ends of the tubes $a'$ and $a^2$ outside the seals are removed, whereupon the lamps are ready to receive their outside fixtures. Here it is to be observed that the small extension of the tube $a^2$ above the bottom of the globes is made with the object of causing a small portion $a^3$ of the alkali-metal composition to permanently remain within the globe after the sealing of the tubes for the purpose hereinafter set forth.

It is also to be observed that when the metal tube $a^2$ has been cut at the outside end of the flat seal the edge of said seal of the lamp is cautiously soldered, so as to make the seal safe and permanent. The second and third main forms of my lamp resulting from the described process may now be finished as indicated in Figs. 6 and 34, respectively, and are then ready for use, or the conductors $d'$ thereof may be connected to any suitable outside fixture for the purpose of facilitating the attachment and replacing of the lamps with reference to various electrical plants. The first form of my lamp resulting from the process I preferably finish as indicated by Fig. 1, where the center piece $b^3$, made from hard rubber, glass, porcelain, or wood treated in heated paraffin or other suitable insulating material, is screwed in place, as shown, said center piece having in its middle a metal screw $c^3$, in the center of which is a hole through which the insulated conductor $d'$ is drawn out and by soldering secured to the screw $c^3$, which now will form the one pole of the lamp, while the metal ring $u$ of the lamp serves as the other. The modified form illustrated in Fig. 2 can of course be connected similarly or in any other way to suit convenience. The characteristic qualities of my lamp produced as just described can readily be demonstrated, reference being made to the described procedure of its manufacture. The space within the globe is a practically perfect vacuum, as the alkali-metal composition has driven out every appreciable quantity of gas from the globes, and as to remaining traces of gas which, although not large enough to be seen or appreciated, may be theoretically admitted, due to the occlusion of such traces in the pores of the metal conductors, the carbon filament, and the alkali-metal composition itself, it may be positively stated that they contain neither oxygen nor moisture—that is to say, water-vapor—as every trace of oxygen must have chemically combined with the alkali metals, and every trace of moisture must have been decomposed, forming alkali hydroxid and alkali-metal hydrogen, the latter according to the formula $R_2H_4$. Supposed traces of free hydrogen must also combine with a quantity of the alkali metal remaining within the globe under the same formula, and any suggested trace of nitrogen must, after having combined with its equivalent of carbon from the filament, (of which of course there will be an insignificant quantity,) combine to form a solid with said remaining alkali metal, according to the formula CNR. Said suggested traces of remaining gases within the globe, having thus all entered into non-volatile combinations with the remaining alkali metals, cannot exercise any further action on the carbon filament of my lamp, nor bring about the destruction of said filament. From a chemical point of view there is no theoretical reason why the pure and infusible carbon filament of my lamp should not last not for eight hundred to twelve hundred hours, as claimed with reference to lamps heretofore invented, but for fifty thousand to one hundred thousand hours.

Another important feature of my lamp results from my new arrangements for electrical connection from the exterior to the interior of the globe. The stopper $b'$, on the one hand, and the seals of $e'$, protected by $h'$ or $b'$, on the other, as well as finally in some cases the composition of $d'$, will allow the use of conductors $d'$ of any desirable size without endangering the durability of the seals or the permanence of the vacuum, and in addition to this comes the advantage that the precious platinum metal used by other inventors may be entirely dispensed with; but as the greatest advantage of all may perhaps be regarded the great facility of replacing a destroyed filament (without destroying the globe) in that special form of my lamp which is represented in Figs. 1 to 5. The joint between $u$ and $b'$ need only be heated so as to melt the solder, whereupon $b'$ can be unscrewed and a new filament put in place.

In addition it is further to be observed that in Fig. 37 is shown a method of securing the ring $u$ hermetically to the glass globe $x$, $r^5$ in said figure being a mold of fire-clay or other suitable material surrounding the neck of globe $x$ and leaving an open space $s^5$ between itself and said neck into which the ring $u$ can be directly cast, $x$ having been previously heated sufficiently not to crack during the casting operation.

To substantially specify this, what I claim is—

1. The process of manufacturing an incandescent lamp, which consists in arranging within a solid inclosure an electrically-conducting filament, foil, or body, adapted to become incandescent by an electric current, introducing liquid alkali-metal composition into said inclosure so as to fill the same, sealing the inclosure except at the exit for the liquid alkali-metal composition, removing the composition from said inclosure in such a way as to form a barometric vacuum therein, and finally hermetically sealing the inclosure; substantially as described.

2. The process of manufacturing an incandescent lamp, which consists in arranging within a solid inclosure an electrically-conducting filament, foil, or body, adapted to become incandescent by an electric current, introducing liquid alkali-metal composition into said inclosure so as to fill the same, sealing the inclosure except at the exit for the liquid alkali-metal composition, removing the composition except a small quantity thereof from said inclosure, and in such a way as to form a barometric vacuum therein and finally hermetically sealing the inclosure; substantially as described.

3. The process of manufacturing an incandescent lamp, which consists in arranging within a solid inclosure an electrically-conducting filament, foil, or body, adapted to become incandescent by an electric current, expelling the air contained in the inclosure by a non-oxidizing or neutral gas introduced therein, afterward removing said gas by a liquid alkali-metal composition introduced in the inclosure so as to fill the same, sealing the inclosure at the gas-exit, forming a barometric vacuum in the inclosure by removal of liquid alkali-metal composition and finally hermetically sealing the inclosure; substantially as described.

4. The process of manufacturing an incandescent lamp, which consists in arranging within a solid inclosure an electrically-conducting filament, foil, or body, adapted to become incandescent by an electric current, expelling the air contained in the inclosure by a non-oxidizing or neutral gas introduced therein, afterward removing said gas by a liquid alkali-metal composition introduced in the inclosure so as to fill the same, sealing the inclosure at the gas-exit, removing the composition with the exception of a small quantity thereof from said inclosure in such a way as to form a barometric vacuum therein and finally hermetically sealing the inclosure; substantially as described.

5. The process of manufacturing an incandescent lamp, which consists in arranging within a solid inclosure an electrically-conducting filament, foil, or body, adapted to become incandescent through an electric current and connected to pole-conductors, electrically communicating with the exterior of said inclosure, expelling the air contained in the inclosure by H or N gas introduced therein, removing afterward said gas by liquid alkali-metal composition introduced in the inclosure so as to fill the same, sealing a tube of the inclosure, emptying the alkali metal except a small quantity thereof from said inclosure and in such a way as to form a barometric vacuum therein and finally hermetically sealing the inclosure, substantially as described.

6. The process of manufacturing an incandescent lamp, which consists in introducing alkali metal into the lamp and exhausting and sealing the lamp while alkali metal is still contained therein; substantially as described.

7. The process of manufacturing an incandescent lamp, which consists in expelling the air therein by the introduction of a neutral or non-oxidizing gas, introducing alkali metal into the lamp and then exhausting the neutral or non-oxidizing gas from the lamp and sealing the lamp while alkali metal is still contained therein; substantially as described.

8. An incandescing electric lamp, containing an electrically-conducting filament, foil, or body, adapted to become incandescent by an electric current, the interior of said lamp constituting a vacuum and containing a quantity of alkali metal; substantially as described.

9. An incandescent lamp having an incandescing body of carbon the interior of said lamp constituting a vacuum and containing a quantity of alkali metal; substantially as described.

10. An incandescent electric lamp, containing an electrically-conducting filament, foil, or body adapted to become incandescent by an electric current, the interior of said lamp constituting a vacuum and containing a substance adapted to chemically combine with and convert into non-gaseous form, any gases disturbing said vacuum; substantially as described.

11. An incandescent electric lamp, containing an electrically-conducting filament, foil, or body adapted to become incandescent by an electric current, the interior of said lamp constituting a vacuum and containing a substance adapted to chemically combine with and convert into solid form, any gases disturbing said vacuum; substantially as described.

12. An incandescent electric lamp, containing an incandescing body, and provided with a glass inclosure therefor having about its base a metal sleeve whose expansibility for heat does not exceed that of glass to which the outer surface of the glass is hermetically connected by fusion, and a plug for sustaining the incandescing body within the inclosure.

13. An incandescent electric lamp, containing an incandescing body, and provided with a glass inclosure therefor having about its base a metal sleeve whose expansibility for heat does not exceed that of glass to which the outer surface of the glass is hermetically connected by fusion, and a metal plug for sustaining the incandescing body within the inclosure, said plug and sleeve being hermetically sealed by metal at their junction.

14. An incandescent electric lamp, containing an incandescing body, and provided with a glass inclosure therefor having about its base a metal sleeve to which the outer surface of the glass is hermetically sealed by fusion, the metal of which the sleeve is composed having an expansibility to heat not exceeding that of glass, and a plug for sustaining the incandescing body within the inclosure.

15. An incandescent electric lamp, containing an incandescing body, and provided with a glass inclosure therefor having about its base a metal sleeve whose expansibility for heat does not exceed that of glass to which the outer surface of the glass is hermetically sealed by fusion, and a plug for sustaining the incandescing body, said plug being hermetically sealed to the sleeve and hermetically sealing the inclosure, but out of contact with the interior walls of the glass.

16. An incandescent electric lamp, containing an incandescing body, and provided with a glass inclosure therefor having about its base a metal sleeve whose expansibility for heat does not exceed that of glass to which the outer surface of the glass is hermetically sealed by fusion, said sleeve being freely expansible with the glass, and a plug for sustaining the incandescing body within the inclosure.

17. An incandescent electric lamp, containing an incandescing body, and provided with a glass inclosure therefor having about its base a metal sleeve whose expansibility for heat does not exceed that of glass to which the outer surface of the glass is hermetically sealed by fusion, said sleeve being freely expansible with the glass, and a metal plug for sustaining the incandescing body within the inclosure, said plug and sleeve being hermetically sealed by metal at their junction and said plug being out of contact with the interior walls of the glass.

18. An incandescent electric lamp, containing an incandescing body, and provided with a glass inclosure therefor having about its base a metal sleeve whose expansibility for heat does not exceed that of glass to which the outer surface of the glass is hermetically connected by fusion, and a plug removably sealed to said sleeve, for sustaining the incandescing body.

19. An incandescent electric lamp, having a leading-in wire having the same expansibility to heat as glass, and made of metal of less expansibility to heat than glass, in combination with metal of greater expansibility to heat than glass.

20. An incandescent electric lamp, having a leading-in wire having the same expansibility to heat as glass, and made of osmium in combination with metal of greater expansibility to heat than glass.

21. An incandescent electric lamp having an incandescing body whose ends are electroplated with a non-oxidizable metal.

22. An incandescent electric lamp having an incandescing body whose ends are electroplated with a non-oxidizable metal in combination with the pole-conductors having their ends similarly electroplated, the ends of the incandescing body being joined to the pole-conductor ends by a non-oxidizable solder.

23. The combination in an electric incandescent lamp of a filament or body of carbon within a practically perfectly-evacuated and hermetically-sealed inclosure, pole-conductors connected to said carbon and communicating electrically with the exterior of the inclosure and a quantity of alkali metal within said inclosure; substantially as described.

24. The combination in an electric incandescent lamp of a filament or equivalent of pure carbon within a practically perfectly-evacuated and hermetically-sealed inclosure, pole-conductors connected to said carbon and communicating electrically with the exterior of the inclosure and a quantity of alkali metal within said inclosure; substantially as described.

25. The combination in an electric incandescent lamp of a filament or equivalent of pure carbon within a practically perfectly-evacuated and hermetically-sealed inclosure, pole-conductors connected to said carbon and communicating electrically with the exterior of the inclosure, the one of said conductors so communicating by being connected to a metallic part of the inclosure, the other by penetrating the inclosure within a hermetical insulated seal therein, and a quantity of alkali metal within said inclosure, substantially as described.

26. The combination in an electric incandescent lamp of a filament or equivalent of pure carbon within a practically perfectly-evacuated and hermetically-sealed inclosure, pole-conductors connected to said carbon and communicating electrically with the exterior of the inclosure through insulating glass tubes; said glass tubes penetrating said inclosure and being hermetically secured thereto by fusion, and forming hermetic seals around the said conductors, metal rings intimately surrounding said seals so as to prevent fracture and a quantity of alkali metal within said inclosure, substantially as described.

27. The combination in an electric incandescent lamp of a filament or equivalent of pure carbon within a practically perfectly-evacuated and hermetically-sealed inclosure, pole-conductors connected to said carbon and communicating electrically with the exterior of the inclosure, through insulating glass tubes, said glass tubes penetrating and hermetically secured to the inclosure by fusion, and forming around the conductors hermetical seals; said conductors being of the same expansion for heat as glass and being made from substances of less expansion from heat than glass, in proper combination with metals of which said expansion is higher, and a quantity of alkali metal within said inclosure, substantially as described.

28. The combination in an electric incandescent lamp, of a leading-in wire hermetically sealed within a glass tube, said glass tube extending within the lamp-bulb and being protected therein against fracture by a metal ring surrounding the seal; substantially as described.

29. The combination in an electric incandescent lamp, of a leading-in wire hermetically sealed within a glass tube, said glass tube extending within the lamp-bulb and being protected therein against fracture by a metal ring surrounding the seal, said leading-in wire being hollow or recessed at said seal; substantially as described.

30. The combination in an electric incandescent lamp, of an incandescing body, pole-conductors connected to said incandescing body and communicating with the exterior of the lamp through insulating glass tubes, said glass tubes penetrating the lamp and being hermetically sealed thereto by fusion, and forming hermetic seals around the said conductors, and metal rings intimately surrounding said seals so as to prevent fracture; substantially as described.

31. The combination in an electric incandescent lamp, of a filament or equivalent of pure carbon within a hermetically-sealed practically perfectly-evacuated inclosure, made partly of glass, partly of metal, pole-conductors connected to said carbon and communicating electrically with the exterior of the inclosure, and a substance within said inclosure adapted chemically to combine with and thereby to transfer into solid form any gaseous, carbonaceous product of combustion (chemical combination with carbon), substantially as described.

32. An incandescent electric lamp, containing an incandescing body, and provided with a glass inclosure therefor having about its base a metal sleeve whose expansibility for heat does not exceed that of glass and to which the outer surface of the glass is hermetically connected by fusion, and a plug for sustaining the incandescing body within the inclosure, the outer end of said plug being adapted to fit within a receiving-socket; substantially as described.

Signed at Washington, in the District of Columbia, this 13th day of March, A. D. 1893.

JOHAN W. TH. OLÁN.

Witnesses:
CHARLES N. LARNER,
J. B. McGIRR.